US012512622B1

(12) United States Patent
Lupica, Jr.

(10) Patent No.: US 12,512,622 B1
(45) Date of Patent: Dec. 30, 2025

(54) ELECTRICAL PLUG EJECTOR SYSTEM

(71) Applicant: David J. Lupica, Jr., Stongsville, OH (US)

(72) Inventor: David J. Lupica, Jr., Stongsville, OH (US)

(*) Notice: Subject to any disclaimer, the term of this patent is extended or adjusted under 35 U.S.C. 154(b) by 383 days.

(21) Appl. No.: 18/235,820

(22) Filed: Aug. 19, 2023

Related U.S. Application Data

(60) Provisional application No. 63/399,666, filed on Aug. 20, 2022.

(51) Int. Cl.
*H01R 13/633* (2006.01)

(52) U.S. Cl.
CPC .................................. *H01R 13/633* (2013.01)

(58) Field of Classification Search
CPC .................................................... H01R 13/633
USPC .......................................................... 439/159
See application file for complete search history.

(56) References Cited

U.S. PATENT DOCUMENTS

| | | | | |
|---|---|---|---|---|
| 2,051,425 A | | 8/1936 | Schlums | |
| 2,551,553 A | * | 5/1951 | Wahl | B25B 23/108 81/125 |
| 2,714,195 A | | 7/1955 | Beatty | |
| 2,977,564 A | * | 3/1961 | Civitelli | H01R 13/633 439/160 |
| 3,008,115 A | * | 11/1961 | Oakes | H01R 13/633 439/160 |
| 5,447,443 A | * | 9/1995 | Ramah | H01R 13/633 439/159 |
| 5,453,899 A | | 9/1995 | Page | |
| 5,645,439 A | | 7/1997 | Nugent, Jr. et al. | |
| 5,735,702 A | | 4/1998 | Hio | |
| 6,716,044 B2 | | 4/2004 | Bertke | |
| 7,234,953 B2 | | 6/2007 | Chen | |
| 7,798,830 B2 | | 9/2010 | Schneider et al. | |
| 10,211,614 B2 | | 2/2019 | Draper | |
| 10,446,990 B2 | | 10/2019 | Dykas et al. | |

* cited by examiner

*Primary Examiner* — Tulsidas C Patel
*Assistant Examiner* — Jeffrey Mountain
(74) *Attorney, Agent, or Firm* — Invention To Patent Services; Alex Hobson

(57) ABSTRACT

An electrical plug ejector system has an electrical plug ejector configured to extend between the receptacle and an electrical plug and has tabs that when pressed, cause an ejector extension to bow outward from the receptacle to eject the plug from the receptacle. The ejector extension is configured between the tabs and transition zones that act as fulcrums to compress the ejector extension. Also, the ejector extension has prong apertures configured to align with the prong receivers of the receptacle. A plug ejector may be configured as part of a receptacle cover or may be configured to detachably attach to a receptacle cover.

20 Claims, 8 Drawing Sheets

ELECTRICAL PLUG EJECTOR SYSTEM

CROSS REFERENCE TO RELATED APPLICATIONS

This application claims the benefit of priority to U.S. provisional patent No. 63/399,666, filed on Aug. 20, 2022; the entirety of which is hereby incorporated by reference herein.

BACKGROUND OF THE INVENTION

Field of the Invention

The invention relates to an electrical plug ejector system configured to allow easy ejection of an electrical plug from a receptacle.

Background

Electrical plugs are often difficult to pull from a receptacle. Also, grabbing the end of the electrical plug can be dangerous as there is a risk of touching the prongs extending therefrom which can cause an electrical shock.

SUMMARY OF THE INVENTION

The invention is directed to an electrical plug ejector system that has an electrical plug ejector configured to eject an electrical plug from a receptacle. The electrical plug ejector may be configured as part of a receptacle cover or may be configured to detachably attach to a receptacle or a receptacle cover. The electrical plug ejector may be configured over a receptacle or receptacle cover or be configured over a receptacle on an extension cord or power strip. The prongs of an electrical plug may be configured through prong apertures in the electrical plug ejector and into the receptacle. The electrical plug ejector has tabs configured on either side of an ejector extension that when pressed cause the ejector extension to bow outward to eject the electrical plug from the receptacle. The electrical plug may be configured to fully or partially eject the prongs of the electrical plug from the receptacle. A partial ejection may allow easy removal of the electrical plug from the receptacle.

An exemplary electrical plug ejector has a first tab configured on a first side, and a second tab configured on a second side of the electrical plug ejector and the ejector extension. The ejector extension is configured between the first and second tabs, and is configured to bow outward from the receptacle when the tabs are pushed inward toward the receptacle, or wall or toward the ejector extension. A first transition zone connects the first tab to the ejector extension and a second transition zone connects the second tab to the ejector extension. The transition zones have a concave curvature from the plug surface of the electrical plug ejector. The electrical plug ejector may be a monolithic component being made of a single piece of material.

The electrical plug ejector has a length from the first side of the electrical plug ejector to the second side of the electrical plug ejector. The length may be about 50 mm or more, about 70 mm or more, about 90 mm or more, about 100 mm or more, about 125 mm or more, about 150 mm or more and any range between and including the length values provided. It may be desirable that the electrical plug ejector not extend too far beyond a receptacle cover. The electrical plug ejector has a plug surface that is configured to interface with an electrical plug, or receive the electrical plug and has a receptacle surface configured to face or contact the receptacle during use.

The plug, as used herein, may be an electrical plug having prongs, such a power prongs and a ground prong. The number of prongs of the plug may be two or more, three or more, four or more and any range between and including the number of prongs listed. Prong apertures are configured through the ejector extension from the plug surface through to the receptacle surface and are configured to receive the prongs of the plug. The number of prong apertures may be two or more, three or more, four or more and any range between and including the number of prong apertures listed. A prong aperture may be a discrete prong aperture or hole through the ejector extension portion of the electrical plug ejector, or a prong aperture may extend in from an edge of the electrical plug ejector.

The ejector extension may have a smooth plug surface, that may be planar, configured to receive an electrical plug and a smooth receptacle surface, that may be planar, configured to extend between the electrical plug and the receptacle.

The electrical plug ejector may be configured to extend over a receptacle which may be on a power cord, such as an extension cord or power strip, or configured in an outlet in a wall, floor or ceiling, which may have a receptacle cover. The receptacle has prong receivers that are configured to receive prongs of the electrical plug. The electrical plug ejector is configured to extend over the receptable whereby the prong apertures of the electrical plug ejector are aligned with the prong receivers of the receptacle. The prongs of the electrical plug may be configured through the prong apertures of the electrical plug ejector and into the prong receivers of the receptacle, whereby the electrical plug ejector and more specifically, the ejector extension, is configured between the electrical plug and the receptacle.

The ejector extension is configured to bow away from the receptacle, or form a convex curved shape along the plug surface, to at least partially eject the plug from the receptacle when the first tab and the second tab are pressed towards the receptacle or towards the receptacle surface of the electrical plug ejector. When the first tab and the second tab are pressed towards the receptacle, the first transition zone acts as a fulcrum between the first tab and the ejector extension, and the second transition zone acts as a fulcrum between the second tab and the ejector extension to compress the ejector extension and cause it to bow away from the receptacle, thereby forming a convex surface along the plug surface. Pressing or actuating the tabs toward the receptacle causes the ejector extension to be compressed in length between the first and second transition zones and therefore bow and form the convex curved shape along the plug surface. When the ejector extension bows away from the receptacle, the plug surface of the electrical plug ejector pushes the plug away from the receptacle, thereby at least partially ejecting the plug from the receptacle.

The ejector extension may be bowed away from the receptacle an ejection offset distance. The ejection offset distance may be about 3 mm or more, about 5 mm or more, about 10 mm or more, about 15 mm or more and any range between and including the ejection offset distance values provided.

The first tab and the second tab of the electrical plug ejector may have a convex curvature from or along the plug surface of the electrical plug ejector. This convex surface may provide for a more comfortable interface for pressing the tabs inward toward the receptacle by hand. The first tab and the second tab extend to a tab offset distance measured from the receptacle surface of the ejector extension, which may be about 3 mm or more, about 5 mm or more, about 10 mm or more, about 15 mm, about 20 mm or more and any range between and including the tab offset distances provided. The tab offset distance provides room for the tabs to be pressed or actuated inward toward the receptacle. The first transition zone and the second transition zone of the electrical plug ejector may have a concave curvature along the plug surface of the electrical plug ejector. The first tab and first transition zone are connected whereby the convex curvature of the first tab and the concave curvature of the first transition zone form an "S" shape. Likewise, the second tab and second transition zone are connected whereby the convex curvature of the second tab and the concave curvature of the second transition zone form an "S" shape.

The receptacle surface of the electrical plug ejector faces the receptacle and may be part of a receptacle cover or be detachably attachable to a receptacle cover, or outlet cover. The receptacle cover is configured to extend between the receptacle and the electrical plug. The receptacle cover has a receptacle opening that may align with the receptacle and allow the electrical plug or prongs of the electrical plug, and/or a portion of the receptacle to extend through the receptacle opening. The receptacle cover opening may include a plurality of prong opening that are aligned with the receptacle openings or may have a larger opening to allow the receptacle to extend through the opening. The receptacle may have a receptacle width, and the receptacle cover may have a receptacle cover width. The receptacle cover width may be greater than the receptacle width. The length of the electrical plug ejector may be greater than the receptacle cover width, and therefore greater than the receptacle width.

A receptacle cover may have an ejector attachment aperture that may be configured to receive an attachment extension of the electrical plug ejector to detachably attach the electrical plug ejector to the receptacle cover. The attachment extension of the electrical plug ejector may extend from the receptacle surface of the electrical plug ejector and may have a bend or may be a hook. The attachment extension may alternatively be received by an ejector attachment aperture configured on or in the receptacle rather than in the receptacle cover to detachably attach the electrical plug ejector directly to the receptacle without use of the receptacle cover.

The electrical plug ejector may further have a plurality of attachment extensions. A first attachment extension may be configured on the first side of the ejector extension, and a second attachment extension may be configured on the second side of the ejector extension. The attachment extensions may be configured in the transition zone or between the ejector extension and the tab. A first attachment extension may extend from the first transition zone, and the second attachment extension may extend from the second transition zone. A receptacle may have two ejector attachment apertures. A first ejector attachment aperture may receive the first ejector extension, and a second ejector attachment aperture may receive the second ejector extension to detachably attach the electrical plug ejector to the receptacle.

The receptacle cover may be configured with a first ejector attachment aperture and a second ejector attachment aperture. The first ejector attachment aperture may be configured on a first side of the receptacle opening, and the second ejector attachment aperture may be configured on a second side of the receptacle opening. The first ejector attachment aperture may receive the first ejector extension, and the second ejector attachment aperture may receive the second ejector extension to detachably attach the electrical plug ejector to the receptacle cover.

The electrical plug ejector may have four attachment extensions. A first attachment extension and second attachment extension may be configured on the first side of the ejector extension. A third attachment extension and fourth attachment extension may be configured on the second side of the ejector extension. The first attachment extension and second attachment extension may extend from the first transition zone, and the third attachment extension and fourth attachment may extend from the second transition zone. The receptacle may have four ejector attachment apertures. A first ejector attachment aperture may receive the first ejector extension, a second ejector attachment aperture may receive the second ejector extension, a third ejector attachment aperture may receive the third attachment extension, and a fourth ejector attachment aperture may receive the fourth attachment extension to detachably attach the electrical plug ejector to the receptacle.

The receptacle cover may be configured with a first ejector attachment aperture, a second ejector attachment aperture, a third ejector attachment aperture, and a fourth ejector attachment aperture. The first and second ejector attachment apertures may be configured on the first side of the receptacle opening, and the third and fourth ejector attachment apertures may be configured on the second side of the receptacle opening. The first ejector attachment aperture may receive the first ejector extension, the second ejector attachment aperture may receive the second ejector extension, the third ejector attachment aperture may receive the third attachment extension, and the fourth ejector attachment aperture may receive the fourth attachment extension to detachably attach the electrical plug ejector to the receptacle cover.

An ejector attachment aperture may be configured to receive and retain the ejector extensions. An ejector attachment aperture may be rectangular in shape or may be U-shaped. In an exemplary embodiment some of the ejector attachment apertures are rectangular, and other ejector attachment apertures are U-shaped. For example, the first and third ejector attachment apertures may be rectangular and the second and fourth ejector attachment apertures may be U-shaped. The U-shaped ejector attachment aperture may be configured to deflect to allow insertion of the attachment extension therein.

The electrical plug ejector system may have two electrical plug ejectors. A first electrical plug ejector may be configured over a first receptacle of a duplex receptacle and a second electrical plug ejector may be configured over a second receptacle of said duplex receptacle. The receptacle cover may be configured between the electrical plug ejectors and the duplex receptacle. The first and second electrical plug ejectors may both be detachably attached to the receptacle cover or may be coupled to the receptacle cover and form a monolithic component that is made from a single piece of material.

The electrical plug ejector may be a monolithic component being made from a single piece of material, such as by being molded to form the electrical plug ejector. A monolith electrical plug ejector may include the first and second tab, the transition zones and the ejector extension and may also include attachment extension or extensions. In addition, a monolith electrical plug ejector may include the electrical plug ejector coupled to a receptacle cover, wherein the receptacle cover and the electrical plug ejector are a one-piece unit or made from a single piece of material, such as by molding. The first and second electrical plug ejectors and the receptacle cover may be a monolith electrical plug ejector, meaning that the first electrical plug ejector and the second electrical plug ejector are permanently connected to the receptacle cover to form one piece component.

The electrical plug ejectors and the receptacle cover may be made of plastic. This plastic may include, but is not limited to, high-density polyethylene, low-density polyethylene, polyurethane and poly-vinyl chloride. The electrical plug ejectors and the receptacle cover may be formed by injection molding. The monolith electrical plug ejector(s) may include the receptacle cover, all formed by injection molding a single part from plastic, for example. The monolith electrical plug ejector(s) which may include the receptacle cover may be formed by fusing the electrical plug ejectors to the receptacle cover. Fusing the electrical plug ejectors to the receptacle cover may be accomplished by use of an adhesive. Fusing the electrical ejectors to the receptacle cover may alternatively be accomplished by melting mating surfaces of the electrical plug ejectors and receptacle cover, contacting the mating surfaces to one another, and allowing the mating surfaces to cool.

A receptacle may be configured in a wall, ceiling or floor, and may have a receptacle cover to extend around the prong receivers, or a receptacle may be configured on an electrical extension cord, power cord and may include one or more receptacles and may be referred to as a power strip.

Ejecting an electrical plug or the prongs of an electrical plug from a receptacle, as used herein, includes partial ejection, wherein the prongs are backed out of prong receives and the plug is move away from the receptacle.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
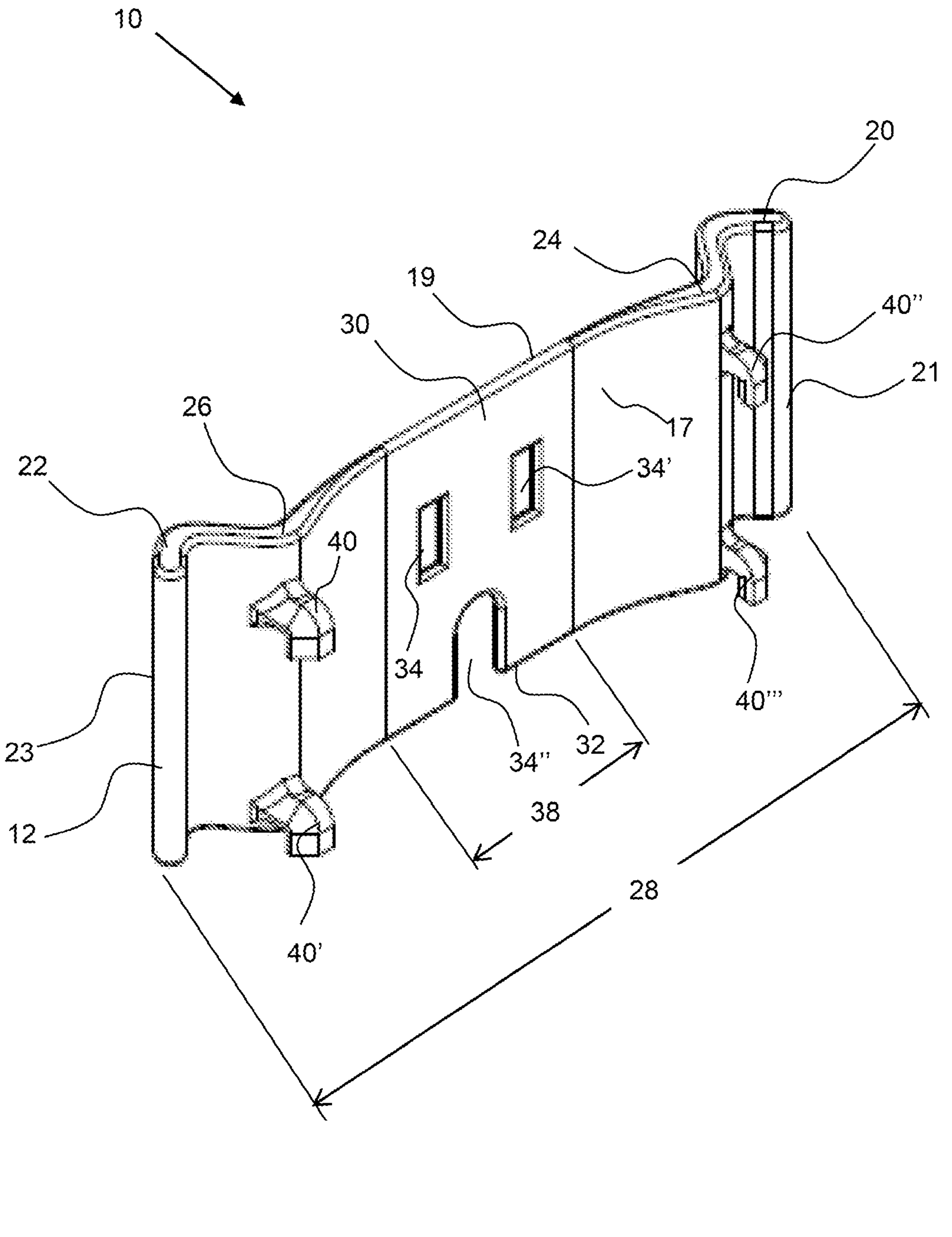
FIG. 1 shows a top back perspective view of an electrical plug ejector of an electrical plug ejector system.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 7:
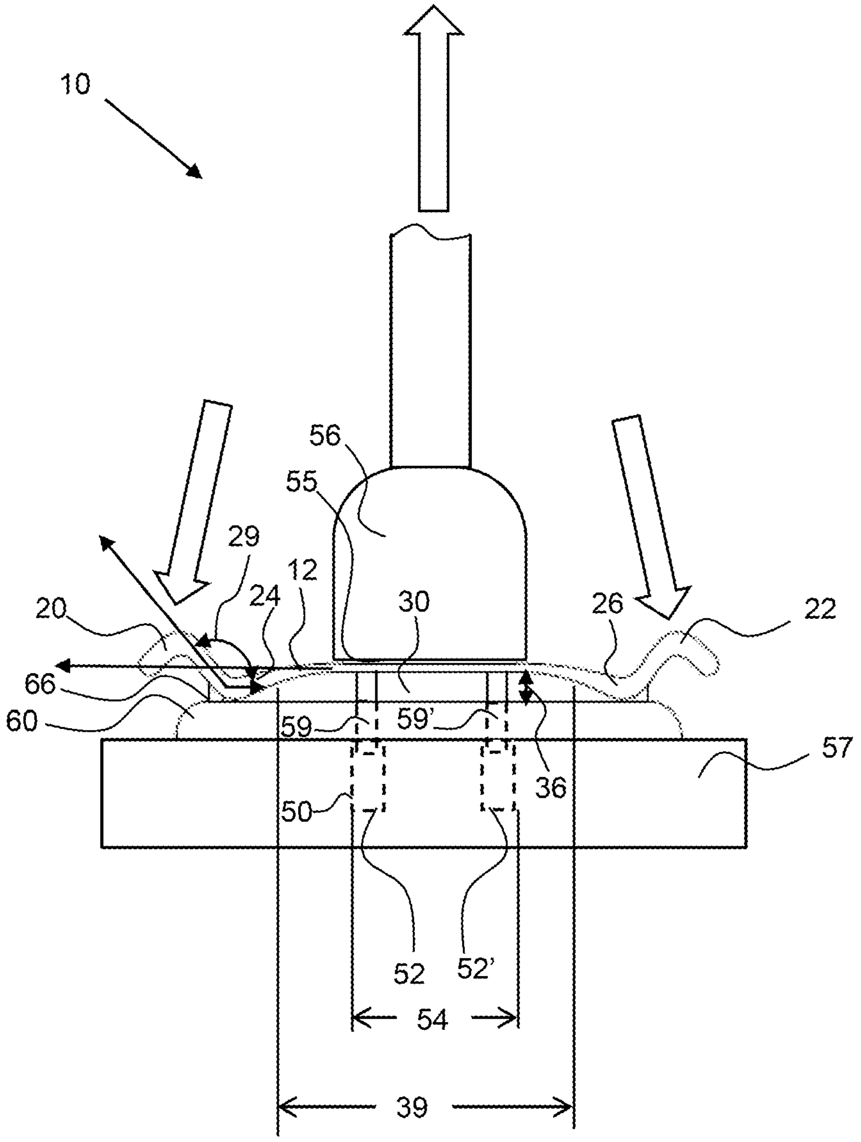
FIG. 7 shows a top view of an electrical plug ejector system shown in FIG. 6 with the tabs being pressed in toward the receptacle to eject the plug from an outlet.

As shown in FIG. 1, an electrical plug ejector 12 of an electrical plug ejector system 10 has a first tab 20 configured on a first side 21 and a second tab 22 configured on a second side 23. The plug ejector has a length 28 from the first side 21 to the second side 23. An ejector extension 30 is configured between the first tab 20 and the second tab 22 and has a resting length 38 when the tabs are not being pressed to eject an electrical plug inserted through the prong apertures 34, 34' and 34" of the ejector extension 30. As described herein, when the tabs are actuated in toward the receptacle surface 17, the ejector extension is compressed in length and therefore bows outward to a convex shape along the plug surface 19, wherein the resting length is shorted to an ejector length, as shown in FIG. 7. A first transition zone 24 connects the first tab 20 to the ejector extension 30, and a second transition zone 26 connects the second tab 22 to the ejector extension 30. The first tab 20 and second tab 22 extend out from the transition zone and have a curved interface end, wherein the tabs have a convex curvature or shape along the plug surface 19. The first transition zone 24 and second transition zone 26 have a concave curvature or shape along the plug surface 19, the surface configured to receive an electrical plug and that faces out when the electrical plug ejector 12 is coupled over a receptacle. In this manner, the extension from the transition zone to the side of the ejector has an “S” shape formed by the concave curvature of the transition zone and the convex curvature of the tab to the interface end. The receptacle surface 17 is opposite the plug surface 19 and is configured to extend over a receptacle, such as a wall receptacle, receptacle cover or a receptacle on an extension cord or power strip having one or more receptacles for receiving a plurality of electrical plugs.

The ejector extension 30 extends between the first transition zone 24 and the second transition zone 26. The ejector extension may be planar or have a planar portion configured to extend over the receptacle cover opening or a receptacle of the outlet. The ejector extension 30 is configured to bow to a convex shape from the plug surface 19, when the first tab 20 and second tab 22 are pressed in toward the receptacle of toward the receptacle surface 17. Three prong apertures 34, 34', and 34" are configured in the ejector extension 30. Prong apertures 34 and 34' are power prong apertures, configured to receive power prongs of an electrical plug, while prong aperture 34" is a ground prong aperture, configured to receive a ground prong from an electrical plug. Each of the three prong apertures 34, 34', and 34" extends through the ejector extension. Prong aperture 34", a ground prong aperture is configured on an edge 32 of the plug ejector and is not a discrete prong aperture like the power prong apertures, and as it is not completely enclosed within the ejector extension 30.

The plug ejector 12 has four attachment extensions 40, 40', 40", and 40'". Two of the attachment extensions 40 and 40' extend from the second transition zone 26, and two of the attachment extensions 40" and 40'" extend from the first transition zone 24 in the same direction as the attachment extensions 40 and 40" that extend form the second transition zone 26. All four attachment extensions 40, 40', 40", and 40'" hook or bend in the same direction, toward the edge 32 of the plug ejector. This is to say that a portion of each attachment extension 40, 40', 40", and 40'" extends at an angle from the portion of the attachment extension connected to its respective transition zone, and that said angled portion of each attachment extension 40, 40', 40", and 40'" extends in the same direction as the angled portion of the other attachment extension 40, 40', 40", and 40'".

Figure 2:
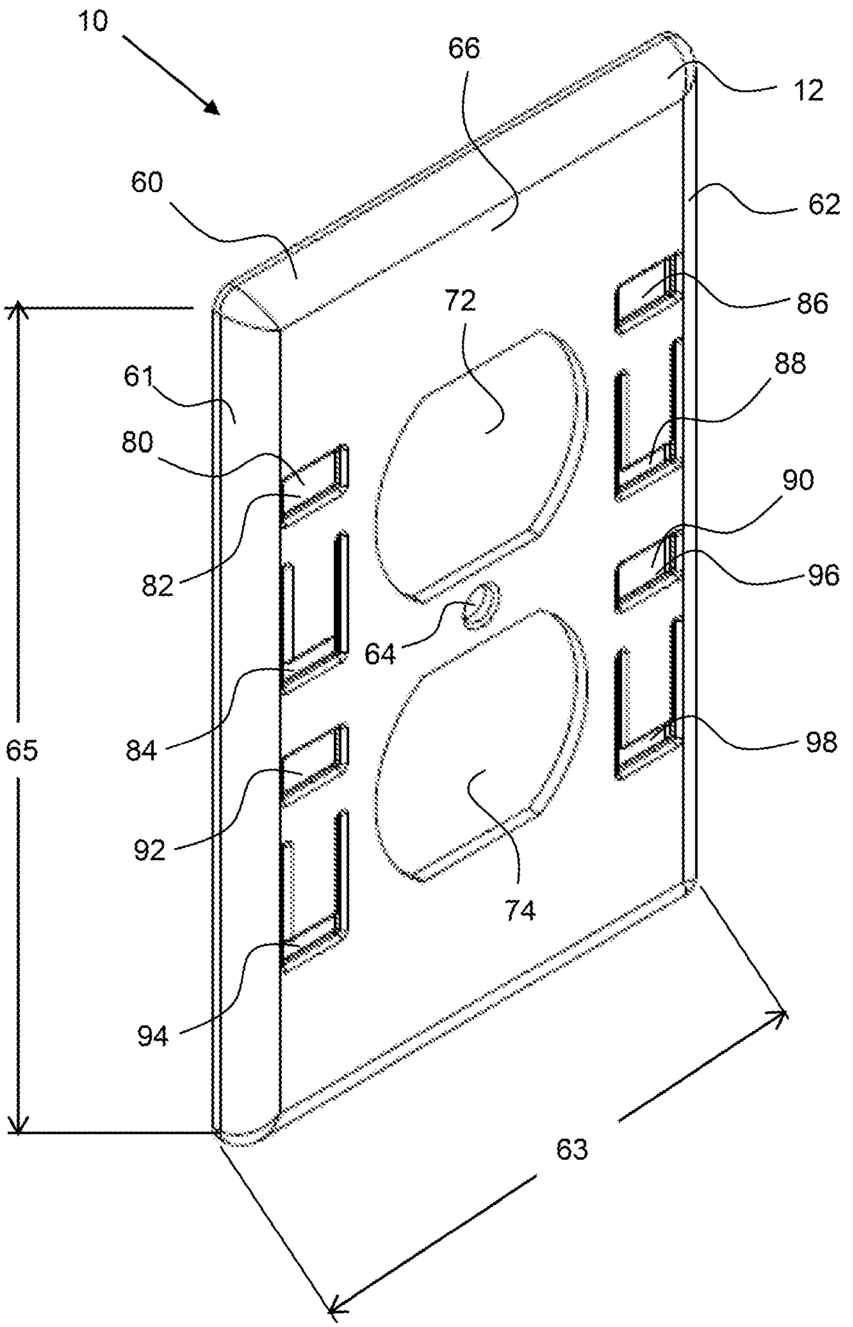
FIG. 2 shows a top front perspective view of a receptacle cover of an electrical plug ejector system, the receptacle cover having two receptacle openings.

As shown in FIG. 2, a receptacle cover 60 of an electrical plug ejector system 10 has a receptacle cover width 63 and a receptacle cover height 65 that may be dimensioned to correspond with standard receptacle cover plates and to cover an electrical receptacle. The receptacle cover 60 also has a first receptacle opening 72 and a second receptacle opening 74 and is therefore configured to fit over a duplex receptacle. The first receptacle opening 72 and second receptacle opening 74 are aligned along the receptacle cover width 63. A receptacle cover screw receiver 64 is configured between the first receptacle opening 72 and the second receptacle opening 74.

A first ejector attachment aperture set 80 is configured along a first side 61 of the receptacle cover 60 and a second ejector attachment aperture set 90 is configured along a second side 62 of the receptacle cover 60 and are configured the same offset distance from their respect side. The first ejector attachment aperture set 80 has a first ejector attachment aperture 82, a second ejector attachment aperture 84. a third ejector attachment aperture 86, and a fourth ejector attachment aperture 88. The first ejector attachment aperture 82 and second ejector attachment aperture 84 are configured on the first side 61 of the first receptacle opening 72. The third ejector attachment aperture 86 and fourth ejector attachment aperture 88 are configured on the second side 62 of the first receptacle opening 72. The first ejector attachment aperture 82 and third ejector attachment aperture 86 are rectangular. The second ejector attachment aperture 84 and fourth ejector attachment aperture 88 are “U-shaped”. The tab formed in the receptacle cover 60 by the U-shaped aperture is configured to deflect for insertion of the attachment extension.

The second ejector attachment aperture set 90 has a fifth ejector attachment aperture 92, a sixth ejector attachment aperture 94, a seventh ejector attachment aperture 96, and an eighth ejector attachment aperture 98. The fifth ejector attachment aperture 92 and sixth ejector attachment aperture 94 are configured on the first side 61 of the second receptacle opening 74. The seventh ejector attachment aperture 96 and eight ejector attachment aperture 98 are configured on the second side 62 of the second receptacle opening 74. The fifth ejector attachment aperture 92 and seventh ejector attachment aperture 96 are rectangular. The sixth ejector attachment aperture 94 and eight ejector attachment aperture 98 are “U-shaped”.

Figure 3:
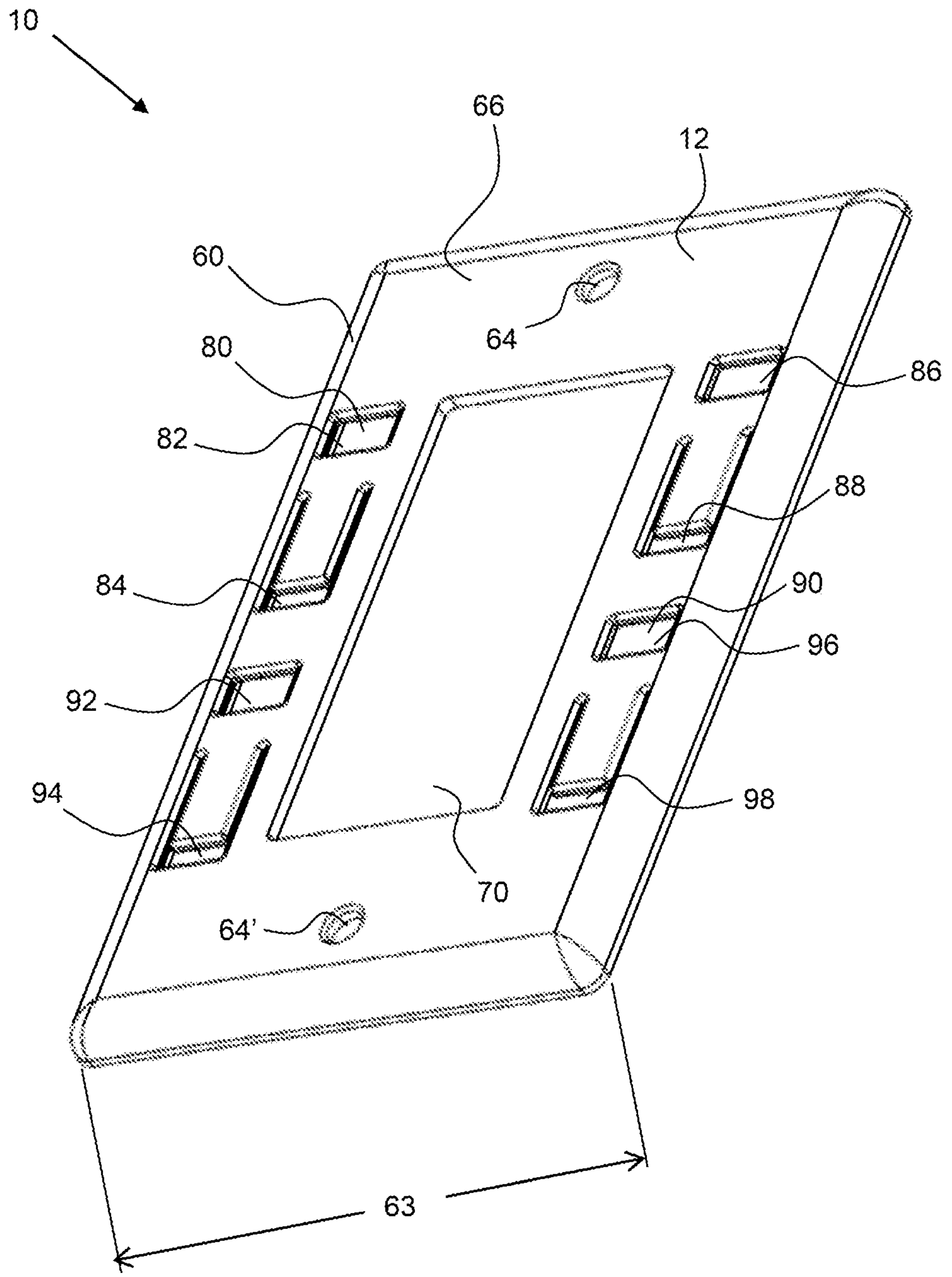
FIG. 3 shows a bottom front perspective view of a receptacle cover of a plug ejector system, the receptacle cover having one receptacle opening.

As shown in FIG. 3, a receptacle cover 60 has an receptacle cover width 63. The receptacle cover 60 shown in FIG. 3 has a single receptacle opening 70 that extends through the receptacle cover 60. A receptacle may extend through this receptacle opening and may be a duplex receptacle. Two receptacle cover screw receivers 64 and 64' are configured on opposite ends of the receptacle opening 70. A first ejector attachment aperture set 80 and a second ejector attachment aperture set 90 are configured parallel to one another at the same distance along the receptacle cover width 63. The first ejector attachment aperture set 80 has a first ejector attachment aperture 82, a second ejector attachment aperture 84, a third ejector attachment aperture 86, and a fourth ejector attachment aperture 88. The second ejector attachment aperture set 90 has a fifth ejector attachment aperture 92, a sixth ejector attachment aperture 94, a seventh ejector attachment aperture 96, and an eighth ejector attachment aperture 98.

Figure 4:
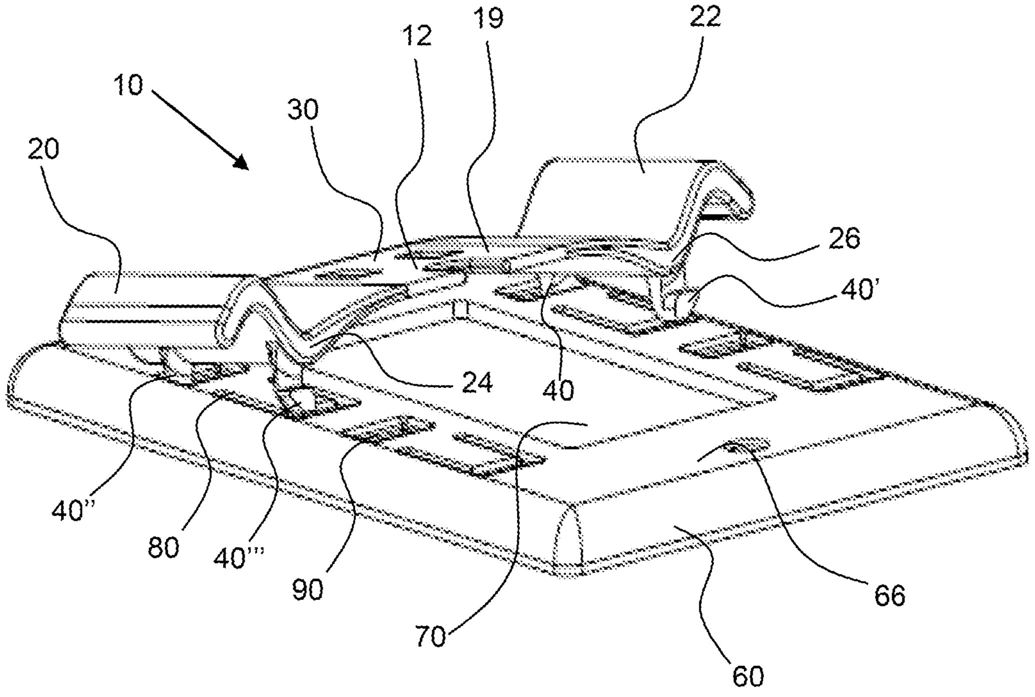
FIG. 4 shows a bottom front perspective view of an electrical plug ejector system with an electrical plug ejector and a receptacle cover being assembled using attachment extensions of the plug ejector and ejector attachment apertures of the receptacle cover.

As shown in FIG. 4, an electrical plug ejector system 10 has an electrical plug ejector 12 and a receptacle cover 60. The receptacle cover has a single receptacle opening 70. The electrical plug ejector 12 is removably attached to the receptacle cover 60 by inserting the attachment extensions 40, 40', 40", and 40'" into the ejector attachment apertures of the first ejector attachment aperture set 80. The electrical plug ejector 12 may then be pivoted to engage the attachment extensions 40, 40', 40", and 40'" with the first ejector attachment aperture set 80, thereby securing the electrical plug ejector 12 to the receptacle cover 60. The electrical plug ejector 12 is removably attached to the receptacle cover 60 in a manner whereby the electrical plug ejector 12 is configured over a portion of the receptacle opening 70.

Figure 5:
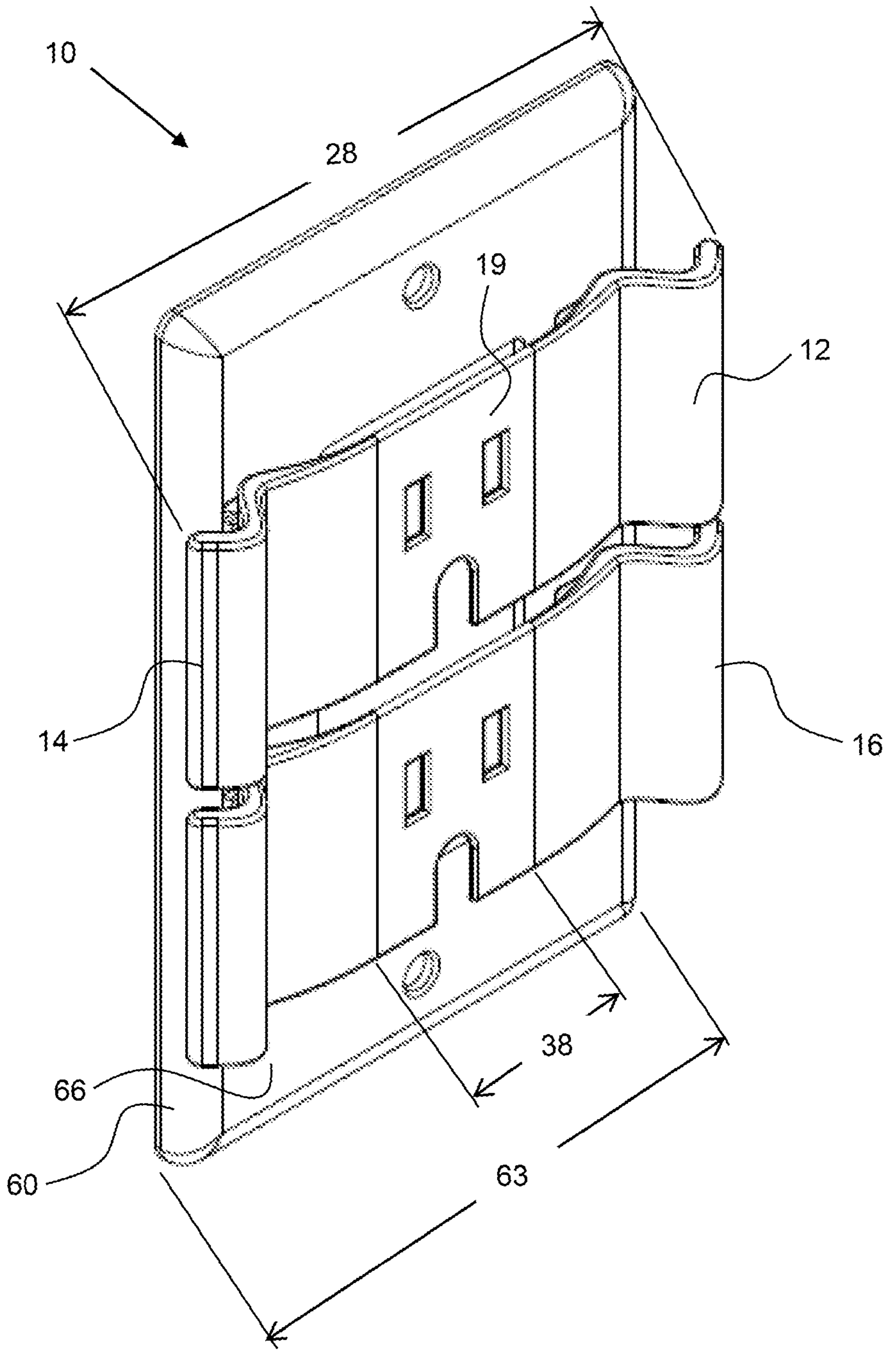
FIG. 5 shows a top front right-side perspective view of an electrical plug ejector system with a first electrical plug ejector and a second electrical plug ejector configured on a receptacle cover.

As shown in FIG. 5, an electrical plug ejector system 10 is configured over a duplex receptacle having two receptacles with two electrical plug ejectors, a first electrical plug ejector 14 and a second electrical plug ejector 16. The first electrical plug ejector 14 and second electrical plug ejector 16 are configured parallel to one another on the receptacle cover 60 whereby the first electrical plug ejector 14 and second electrical plug ejector 16 each extend across the receptacle cover width 63. The first electrical plug ejector 14 and second electrical plug ejector 16 have the same plug ejector length 28. The plug ejector length 28 is greater than the receptacle cover width 63.

Figure 6:
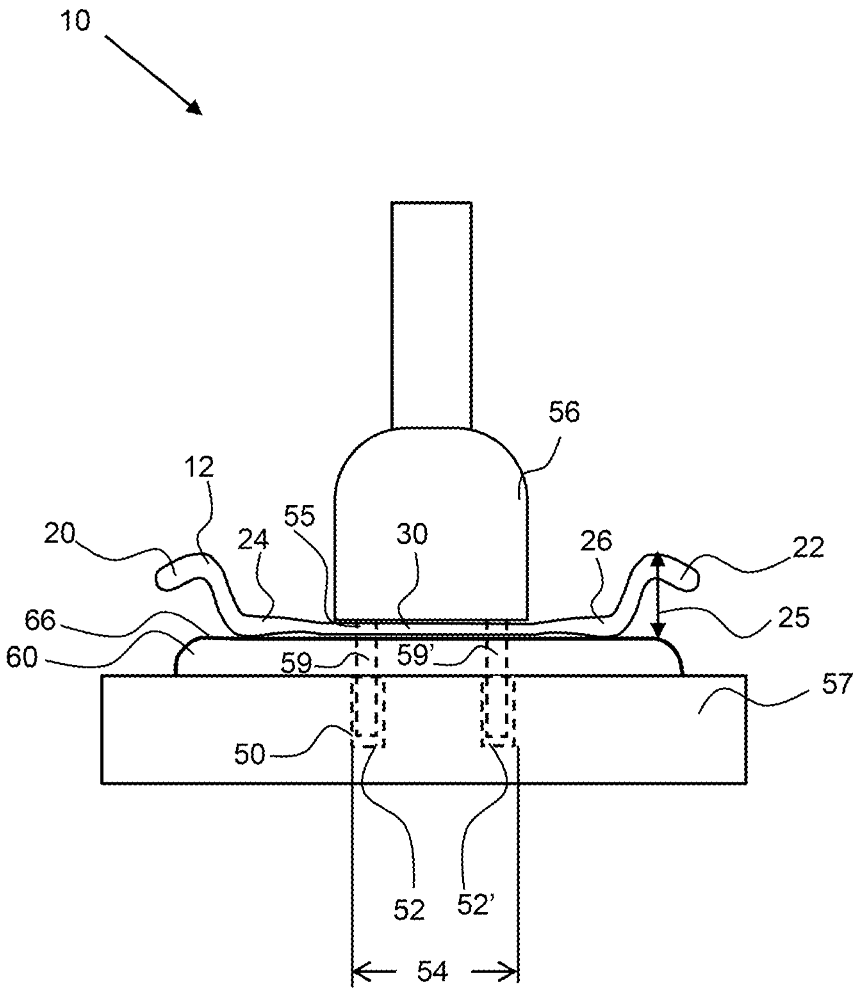
FIG. 6 shows a top view of an electrical plug ejector system with an electrical plug plugged into a receptacle through the electrical plug ejector with the prongs of the electrical plug extending through the prong apertures in the ejector extension.

Referring now to FIGS. 6 and 7, an electrical plug ejector system 10 has an electrical plug ejector 12 that is configured over a receptacle cover 60. The receptacle cover 60 is configured over receptacle 50. The receptacle 50, configured in a wall 57, has two prong receivers 52 and 52' for receiving the prongs 59, 59' of the electrical plug 56. The prong apertures 34, 34' (shown in FIG. 1) align with the prong receivers 52 and 52'. The prong apertures may further be about the same size and shape as the prong receivers 52 and 52', or slightly larger, such as about 10% or 20% larger or more. The receptacle has a receptacle width 54. As shown, the prongs 59, 59' of the electrical plug 56 are inserted into the prong receivers of the receptacle 50, such that the electrical plug is inserted into the receptacle, and the ejector extension 30 is planar and extends between the receptacle surface 55 of the electrical plug 56 and the plug surface 66 of the receptacle cover 60, wherein the ejector extension is parallel with and sandwiched between the receptacle surface 55 of the electrical plug and the plug surface 66 of the receptacle cover 60. The tabs, first tab 20 and second tab 22, extend up from the ejector extension 30 a tab offset distance 25 that allows the tabs to be pressed toward the receptacle or the ejector extension.

As shown in FIG. 7, the electrical plug ejector system 10 shown in FIG. 6 is now being used to eject the electrical plug 56 from the receptacle 50. The first tab 20 and the second 22 are being press toward the receptacle 50 (as indicated by the large bold arrows) which causes the ejector extension to bow away from the receptacle to create an ejection offset distance 36 that effective ejects the prongs 59, 59' of the electrical plug 56 from the prong receivers 52, 52', respectively, and ejects the electrical plug 56 (as indicated by the large bold arrow pointing away from the electrical plug 56. The prongs 59, 59' may not be fully ejected from the prong receivers 52, 52' but the electrical plug may be easily pulled from the receptacle after pressing the tabs as shown. The ejector extension 30 is compress to an ejector length 39, as the ejector extension is bowed to form a convex shape along the plug surface 19. The tabs are pressed to a tab angle 29 from the plane of the receptacle cover or receptacle, to compress the ejector extension and cause it to bow outward, as shown.

Figure 8:
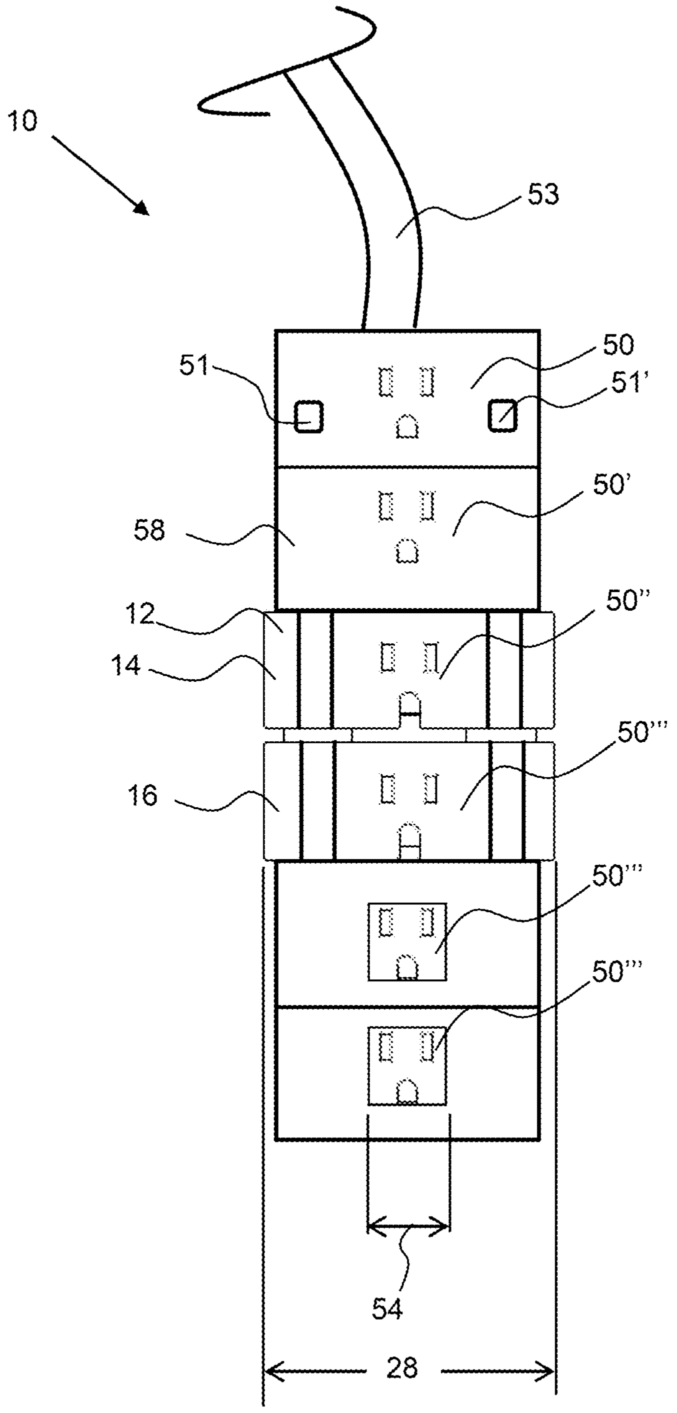
FIG. 8 shows a front view of an electrical plug ejector system with a first plug ejector and a second plug ejector configured on a power strip.

As shown in FIG. 8, multiple receptacles 50, 50', 50", and 50''', 50"", 50'"" are configured on a power strip 58 which may be coupled to an extension cord 53. Receptacles 50" and 50''' have an electrical plug ejector 12 configured thereover. The first electrical plug ejector 14 and the second electrical plug ejector 16 have a plug ejector length 28 that is greater than the receptacle width 54. As shown, the power strip 58 has ejector attachment apertures 51 to allow detachably attachment of the electrical plug ejectors 12.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An electrical plug ejector system comprising:

an electrical plug ejector comprising:

a) a first tab configured on a first side;

b) a second tab configured on a second side, opposite said first side;

c) an ejector extension configured between the first and second tabs;

d) a first transition zone connecting the first tab to the ejector extension;

e) a second transition zone connecting the second tab to the ejector extension;

f) a length extending from the first side to the second side;

g) prong apertures configured through the ejector extension and configured to receive prongs on an electrical plug therethrough; and h) a plug surface configured to interface with said electrical plug;

i) a receptacle surface configured to interface with a receptacle;

wherein the first tab and second tab are configured a tab offset distance from said ejector extension;

wherein the electrical plug ejector is configured to extend over a receptacle with the prong apertures aligned with prong receivers of said receptacle to receive said prongs of said electrical plug through said prong apertures into said receptacle with the ejector extension configured between said electrical plug and said receptacle;

wherein the ejector extension is configured to bow away from the receptacle to at least partially eject said electrical plug from the receptacle when the first tab and the second tab are pressed towards the receptacle; and whereby the first transition zone acts as a fulcrum between the first tab and the ejector extension, and the second transition zone acts as a fulcrum between the second tab and the ejector extension, to compress the ejector extension to cause it to bow when the first tab and the second tab are pressed towards the receptacle.

2. The electrical plug ejector system of claim 1, wherein the ejector extension is bowed away an ejection offset distance of at least 5 mm when the first tab and the second tab are pressed towards the receptacle.

3. The electrical plug ejector system of claim 1, wherein both the first tab and second tab have a convex curvature from the plug surface of the electrical plug ejector.

4. The electrical plug ejector system of claim 1, wherein both the first transition zone and second transition zone have a concave curvature from the plug surface of the electrical plug ejector.

5. The electrical plug ejector system of claim 4, wherein both the first tab and second tab have a convex curvature from the plug surface of the electrical plug ejector.

6. The electrical plug ejector of claim 4, wherein the electrical plug ejector length is greater than a receptacle width.

7. The electrical plug ejector system of claim 4, wherein the electrical plug ejector length is greater than a receptacle cover width.

8. The electrical plug ejector system of claim 1, wherein the electrical plug ejector further comprises an attachment extension extending from the receptacle surface and configured for detachable attachment to a receptacle.

9. The electrical plug ejector system of claim 8, further comprising a receptacle cover comprising:

a receptacle opening for alignment with a receptacle;

an ejector attachment aperture configured to receive the attachment extension of the electrical plug ejector to detachably attach the electrical plug ejector to the receptacle cover.

10. The electrical plug ejector system of claim 9, wherein the electrical plug ejector comprises two attachment extensions with a first attachment extension configured on a first side of the ejector extension and a second attachment extension configured on the second side of the ejector extension, and wherein the receptacle cover comprises two ejector attachment apertures with a first ejector attachment aperture configured on a first side of the receptacle opening and a second ejector attachment aperture configured on a second side of the receptacle opening.

11. The electrical plug ejector system of claim 10, wherein the first attachment extension extends from the first transition zone and the second attachment extension extends from the second transition zone.

12. The electrical plug ejector system of claim 9, wherein the electrical plug ejector comprises four attachment extensions with a first attachment extension configured on a first side of the ejector extension and a second attachment extension configured on the second side of the ejector extension, a third attachment extension configured on a first side of the ejector extension and a fourth attachment extension configured on the second side of the ejector extension, and wherein the receptacle cover comprises four ejector attachment apertures with a first ejector attachment aperture configured on a first side of the receptacle opening, a second ejector attachment aperture configured on a second side of the receptacle opening, a third ejector attachment aperture configured on a first side of the receptacle opening and a fourth ejector attachment aperture configured on a second side of the receptacle opening.

13. The electrical plug ejector system of claim 12, wherein the first attachment extension and third attachment extension extend from the first transition zone and the second attachment extension and fourth attachment extension extend from the second transition zone.

14. The electrical plug ejector system of claim 8, wherein the attachment extension is a hook.

15. The electrical plug ejector system of claim 14, wherein the ejector attachment aperture is U-shaped.

16. The electrical plug ejector system of claim 1, comprising two electrical plug ejectors coupled together and configured to detachably attach to a duplex receptacle.

17. The electrical plug ejector system of claim 1, comprising two electrical plug ejectors coupled to a receptacle cover.

18. The electrical plug ejector system of claim 17, wherein the two electrical plug ejectors and the receptacle cover are a monolithic part.

19. The electrical plug ejector system of claim 18, wherein the electrical plug ejector is made of plastic.

20. The electrical plug ejector system of claim 1, wherein the electrical plug ejector is made of plastic.

* * * * *